Jan. 14, 1958 G. O. D'NELLY ET AL 2,820,143
TRANSISTOR PHASE DETECTOR
Filed April 19, 1955

GREGG O. D'NELLY
NORMAN B. FJELDSTED
INVENTORS.

BY Henry Heyman
ATTORNEY.

United States Patent Office 2,820,143

Patented Jan. 14, 1958

2,820,143

TRANSISTOR PHASE DETECTOR

Gregg O. D'Nelly, Santa Monica, and Norman B. Fjeldsted, Los Angeles, Calif., assignors to Hughes Aircraft Company, Culver City, Calif., a corporation of Delaware Application April 19, 1955, Serial No. 502,319

6 Claims. (Cl. 250—31)

This invention relates generally to discriminator circuits and, more particularly, to circuits for comparing the phase of a reference signal with respect to the time of occurrence of a comparison signal.

Circuits which compare two signals, detecting differences therebetween, and produce an output D. C. voltage which is indicative of the relationship between the compared signals are well known to the art. Such a circuit is commonly referred to as a phase detector or a phase discriminator. Detailed discussion of the various types of phase detectors and their possible applications may be found in chapter 14 of volume 19, Radiation Laboratory Series, entitled "Waveforms," published by McGraw-Hill Book Company, Inc., New York, 1949.

The circuits of this type which are currently used employ vacuum tubes as their active circuit elements. Because of the use of vacuum tubes, it is necessary to have power supplies, biasing supplies, and heater voltage supplies for proper operation. Many circuits of this type require a capacitor and resistor connected in parallel and placed in the grid circuit of the tube or tubes to keep the tubes from conducting during the period when no signals are applied thereto. Even though a vacuum tube when not conducting has substantially infinite resistance when conducting it represents some finite resistance which may be of the order of 100 ohms or more, depending upon the grid voltage, thus placing a further limitation on these phase detectors.

Accordingly, it is an object of the present invention to provide a phase detector which has substantially infinite impedance when in a non-conducting state, and substantially zero impedance when in a conducting state.

Another object of the present invention is to provide a phase detector having substantially fewer circuit components than presently used phase detectors, thus resulting in lower manufacturing costs, smaller size, and less maintenance, and having an overall increase in reliability.

A further object of the present invention is to provide a transistor phase detector which operates with no direct-current bias or power supplies and which produces a direct-current voltage level output signal which is representative of the phase relationship between two signals to be compared.

A phase detector in accordance with the present invention comprises two interconnected transistors, each having an input, an output, and a common electrode in contact with the transistor body. A comparison signal is applied simultaneously across the input and common electrodes of each of the transistors through appropriate coupling circuits. This causes each of the transistors to change from its quiescent non-conduting state to a possible conductive state. A reference signal is simultaneously applied through other coupling circuits across the output and common electrodes of each of the transistors. If the two signals are applied concurrently to the transistors, one or the other of the transistors will conduct, depending upon the phase relationship between the signals. The current flowing through the selected transistor is converted to a direct-current voltage level in a charge storage device which is connected across the output and common electrodes of each of the transistors. The amplitude and polarity of the direct-current voltage level is representative of the phase relationship between the applied reference and comparison signals.

The novel features of the present invention are set forth in particularity in the appended claims. Other and more specific objects of the invention will become apparent from a consideration of the following description taken in connection with the accompanying drawing in which:

Figure 1:
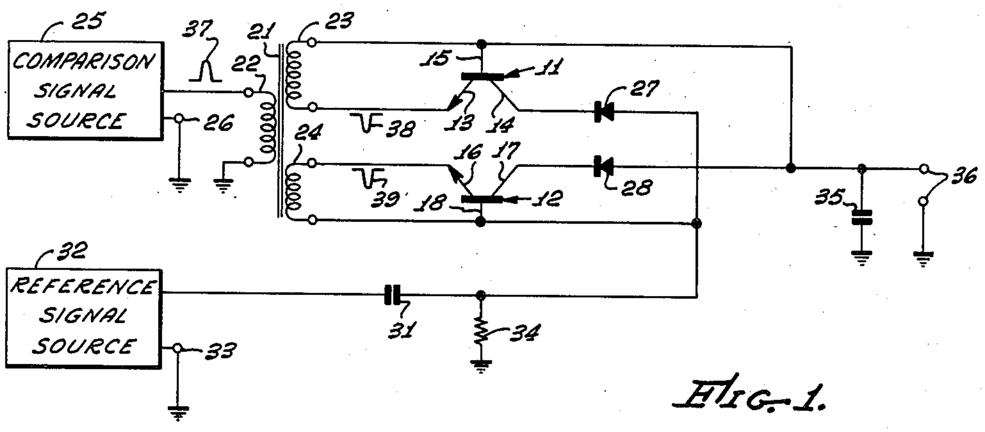
Fig. 1 is a circuit diagram, partly in block form, of the preferred embodiment of the phase detector of the present invention.

Referring now to the drawing and, more particularly, to Fig. 1, there is shown a transistor phase detector circuit including two transistors 11 and 12, each represented by their accepted schematic symbol. The semiconducting body of transistor 11 has an input or emitter electrode 13, an output or collector electrode 14, and a common or base electrode 15 in contact therewith. The semiconducting body of transistor 12 has an input or emitter electrode 16, an output or collector electrode 17, and a common or base electrode 18 in contact therewith. Transistors 11 and 12 may be junction transistors of the N–P–N type. A transformer 21, having a primary winding 22, a first secondary winding 23, and a second secondary winding 24, is employed as a coupling device in the transistor phase detector of Fig. 1.

Comparison signal source 25, which has one terminal 26 that is grounded, is connected to one side of primary winding 22, the other side being grounded. Secondary winding 23 of transformer 21 is connected across emitter 13 and base 15 of transistor 11. Secondary winding 24 is connected across emitter 16 and base 18 of transistor 12. Secondary winding 23 applies the comparison signal 37 from source 25 to transistor 11, while secondary winding 24 impresses the comparison signal 37 on transistor 12. Each of the secondary windings is so wound as to apply the comparison signal to each of the emitters in a polarity such that the transistor is in a condition to conduct as shown by negative pulses 38 and 39. Diode 27 is connected between collector 14 and base 18. Diode 28 is connected between collector 17 and base 15. Each of the diodes 27 and 28 is poled to pass only current flowing through collectors 14 and 17 into the semiconducting body of transistors 11 and 12, respectively. Coupling capacitor 31 is connected between base 18 and reference signal source 32 which has a second terminal 33 that is grounded. Dropping resistor 34 is connected between base 18 and ground. A charge storage device, such as capacitor 35, is connected between base 15 and ground. Also connected across charge storage capacitor 35 are output terminals 36, one of which is grounded.

Figure 2:
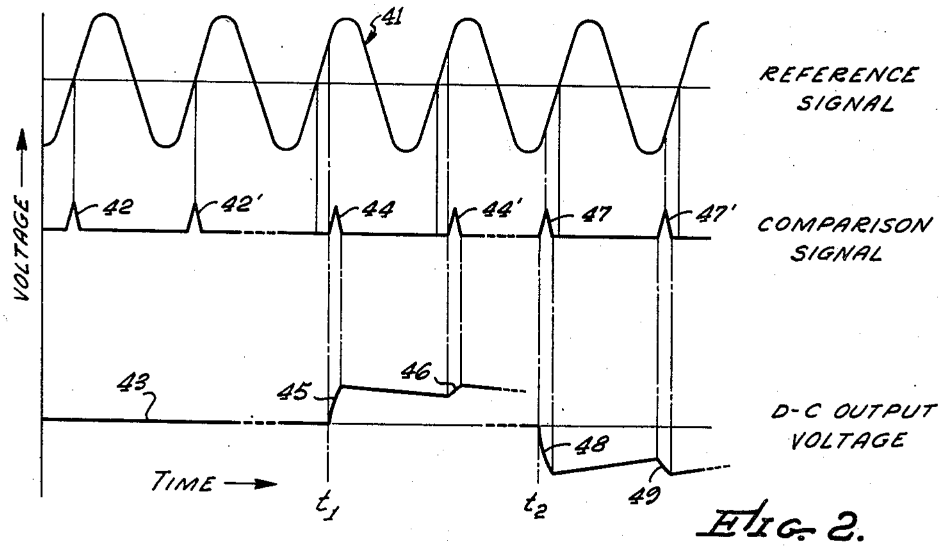
Fig. 2 is a graph illustrating waveforms taken at various points in the circuit of Fig. 1.

In discussing the operation of the circuit of Fig. 1, reference will be made to Fig. 2 wherein the abscissa represents time and the ordinate, voltage. During normal operation, a continuous, periodically recurring reference signal, such as the sine wave 41 of Fig. 2, is applied through coupling capacitor 31 to base 18 and through diode 27 to collector 14 of transistors 12 and 11, respectively. Since no bias is applied to emitter electrodes 13 and 16 of the transistors, each of the transistors is effectively cut off. Therefore, the reference signal will not be passed by either of the transistors.

Assuming now that a comparison signal, such as pulse 42 of Fig. 2, is coupled by way of transformer 21 to emitter 13 and base 15 of transistor 11 and to emitter 16 and base 18 of transistor 12. The comparison signal pulse 42 causes emitter current to flow, thus allowing the transistor to conduct. Therefore, when the comparison and reference signals are applied to each of the transistors concurrently, comparison signal pulses 42 will be passed by either transistor 11 or 12, appearing as a charge upon capacitor 35. During the time that reference signal 41 is negative with respect to its zero point and pulse 42 is applied to the transistors, collector 17 is positive with respect to base 18. Therefore, transistor 12 will conduct, tending to charge capacitor 35 negative with respect to ground. Transistor 11 cannot conduct during this time since the negative portion of reference signal 41 is blocked by diode 27. After reference signal 41 passes through its zero point and becomes positive, transistor 11 will conduct provided comparison signal 42 is still applied thereto. This occurs because the positive reference signal 41 is passed by diode 27, causing collector 14 to become positive with respect to base 15. This conduction tends to charge capacitor 35 positive with respect to ground. Transistor 12 cannot conduct during this time because collector 17 is negative with respect to base 18. Since the charge appearing across capacitor 35 during the time each transistor is conducting is opposite in polarity, the net charge upon capacitor 35 is zero, as indicated by the heavy portion 43 of the direct-current output voltage curve of Fig. 2. If at one period or cycle later, referring to the reference signal, another comparison signal pulse, such as 42', occurs as the reference signal is passing through zero, the direct-current output voltage on capacitor 35 will remain at zero as shown.

If, at some later time, such as $t_1$ on Fig. 2, another pulse, such as 44, is applied to transistors 11 and 12 from comparison signal source 25, and reference signal 41 is positive during the duration of the comparison signal, as shown in Fig. 2, transistor 11 will conduct, charging capacitor 35 positive with respect to ground, as shown by output signal 45 of the direct-current output voltage curve in Fig. 2. Transistor 12 will not conduct since the positive signal applied directly to base 18 is effectively a negative signal on collector 17. After the occurrence of pulse 44, the charge on capacitor 35 will tend to leak off. Since no comparison signal is applied at this time, transistors 11 and 12 are cut off, and they represent a substantially infinite impedance to the discharge path of capacitor 35. The discharge of the capacitor will, therefore, be extremely slow. If another comparison signal pulse, such as 44', is then applied to transistors 11 and 12 and it has the same phase relationship with reference signal 41 as did pulse 44, capacitor 35 will again be charged to the maximum value of reference signal 41 which occurs during the period that the comparison pulse is applied to the transistors.

Assuming now that at some later time, such as at $t_2$, a comparison signal, such as pulse 47, is applied to transistors 11 and 12 while reference signal 41 is negative. Since diode 27 will allow only a positive going signal to be applied to transistor 11, transistor 11 will remain cut off during this period. However, the negative reference signal is applied directly to base 18 of transistor 12. This is equivalent to a positive signal applied to collector 17. Therefore, transistor 12 will conduct, allowing current to flow toward the semiconductor body of transistor 12, thus charging capacitor 35 negative with respect to ground, as shown by 48 on the direct-current output voltage curve of Fig. 2. As before, the charge appearing on capacitor 35 will tend to slowly leak off. However, as a subsequent pulse from the comparison signal source, such as 47', is applied to transistors 11 and 12, transistor 12 will again conduct, restoring the charge on capacitor 35, as shown at 49.

Figure 3:
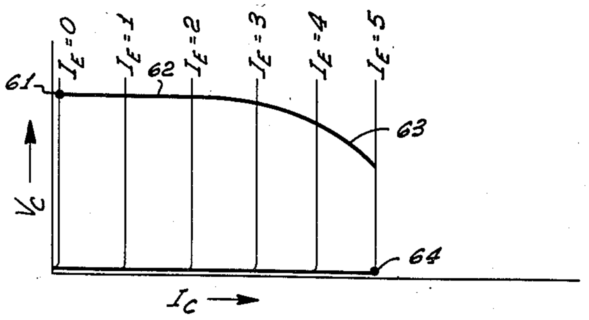
Fig. 3 is a graph illustrating the collector voltage-current characteristics of a junction transistor with a load of the type used in the circuit of Fig. 1.

Transistors 11 and 12 may be N-P-N junction transistors, as shown by the schematic symbol in Fig. 1. If so, the voltage-current characteristics looking into the collector electrode of either of the transistors will be as shown in Fig. 3, wherein the abscissa represents collector current $I_c$ and the ordinate, collector voltage $V_c$. If the period of duration of the comparison signal which is applied to the transistors is very short compared to the period of the reference signal, the voltage appearing on the collectors of each of the transistors can be considered as substantially constant. If no comparison signal is applied to transformer 21, the emitter current will be zero and the collector voltage-current curve will be, as shown in Fig. 3, for this condition, $I_E=0$. Although some collector current may flow under these conditions, no charge will appear on capacitor 35 since both transistors will conduct equally but in opposite directions during respective half cycles of the reference signal. Assume that when a comparison signal is applied to the transistors the reference signal voltage has a certain value, as shown at 61 on Fig. 3. This establishes the operating point of that transistor which would conduct at point 61 on Fig. 3. At this point collector current is very low and collector voltage is quite high; therefore, the resistance looking into the collector is large, on the order of megohms. As time progresses, emitter current begins to flow, and collector current increases. However, since the load in the collector circuit of the transistor is a capacitor, the voltage appearing across the collector-base of the transistor cannot change instantaneously and will, therefore, remain as a straight line for some finite period of time, as shown by curve 62 of Fig. 3.

As capacitor 35 charges, the voltage appearing across the collector-base of the transistor will begin to decrease, as shown by the curved portion 63 of line 62 in Fig. 3. As the emitter current reaches its saturation point, such as for example that curve of the family in Fig. 3 where emitter current $I_E$ is equal to 5 units, the collector voltage will tend to settle on this curve following the $I_E$ curve down as capacitor 35 charges until it reaches point 64. The time required by the capacitor to assume a charge equal to the amplitude of the applied reference signal at this time is determined by the R-C time constant of the capacitor charge path. This is chosen to be less than the duration of the comparison signal pulse so the transistor will change from its non-conducting state, point 61, to its substantially saturated state, point 64, while the comparison signal is applied. At point 64, the collector current is at its maximum and the collector voltage is at its minimum, therefore causing the resistance looking into the collector of the transistor to be very low, on the order of 30 to 40 ohms.

It can be seen, therefore, that line 62, in Fig. 3, represents the load line which is seen by the transistor due to capacitor 35, and that when no comparison signal is applied to the transistors, the impedance looking into the collector is extremely high, and when a comparison signal is applied to the transistors, the impedance looking into the collector is substantialy zero. Therefore, transistors 11 and 12 operate substantially like a switch, being open during the time when no comparison signal is applied, and closed when one is applied. During the time the switch is closed, the comparison signal is passed by one or the other of the transistors, thus charging capacitor 35 positive or negative with respect to ground, depending upon the polarity of the reference signal at this time.

It is to be understood that while a phase detector employing only two transistors and comparing the two signals once each period is shown in Fig. 1 and described in this application, one skilled in the art can readily see that an extension hereto may be made by employing two circuits identical with that shown and connecting the two output capacitors together at a common point and grounding this point. Resistor 34 may then be omitted from each of the circuits as well. A detector which will compare the reference signal with the comparison signal every 180° of the reference signal can be thus obtained. It can be further seen that by varying the occurrence of the comparison signal so that it repeats every 90° of the reference signal, an orthogonal phase detector may be obtained.

It should also be noted that transistors other than of the N–P–N junction type may be utilized in this circuit. For example, if P–N–P junction transistors were to be used, all that would be necessary is to reverse the polarity of diodes 27 and 28 and reverse the polarity of the applied comparison signal in order to obtain the same results. As another example, one transistor may be of the P–N–P type and the other of the N–P–N type. By properly connecting the diodes 27 and 28 and the transformer 21, the operation and results above described may be obtained.

It should be understood that the circuit specifications for the transistor phase detector shown in Fig. 1 may vary according to the design for any particular application. The following circuit specifications are included by way of example only, and are suitable for operation with reference and comparison signals having a frequency of from zero to 1,000 cycles per second.

Transistor 11—N–P–N junction transistor, Germanium products 2501.
Transistor 12—N–P–N junction transistor, Germanium products 2501.
Transformer 21—Pulse transformer capable of passing 250-microsecond pulse.
Diode 27—Silicon junction diode, Texas instrument T–10.
Diode 28—Silicon junction diode, Texas instrument T–10.
Capacitor 31—1 microfarad.
Capacitor 35—10 microfarads.
Resistor 34—100 ohms.

There has been thus disclosed a preferred embodiment of a transistor phase detector for producing a direct-current output voltage level which is representative of the phase relationship between an applied reference signal and an applied comparison signal which has a substantially infinite impedance when the transistors are non-conducting, and substantially zero impedance when they are conducting. Furthermore, it should be noted that no direct-current bias supplies or power supplies are used at any point of the transistor phase detector circuit of the invention.

What is claimed is:

1. A transistor phase detector for producing direct-current voltage levels in response to the phase relationships between applied reference and comparison signals comprising: a first transistor, including a first emitter electrode, a first collector electrode, and a first base electrode; a second transistor, including a second emitter electrode, a second collector electrode, and a second base electrode; first coupling means connected between said first emitter and base electrodes and said second emitter and base electrodes for applying the comparison signal to each of said transistors simultaneously in a polarity to cause each of said transistors to be conditioned to conduct; a first unidirectional current flow device connected between said first collector electrode and said second base electrode; a second unidirectional current flow device connected between said first base electrode and said second collector electrode; second coupling means connected between said second base electrode and a common terminal point for applying a continuous periodically recurring reference signal to each of said transistors simultaneously to cause either said first or said second transistor to pass the comparison signal during the time the reference signal is applied concurrently therewith; and charge storage means connected between said first base electrode and said common terminal for converting said comparison signal to a direct-current voltage level, whereby a direct-current voltage level will be produced at said storage means representative of the phase relationship between the comparison and reference signals.

2. A transistor phase detector for producing direct-current voltage levels in response to the phase relationships between applied reference and comparison signals comprising: a first transistor, including a first emitter electrode, a first collector electrode, and a first base electrode; a second transistor, including a second emitter electrode, a second collector electrode, and a second base electrode; first coupling means including a transformer having a primary winding, a first secondary winding, and a second secondary winding, said first secondary winding being connected between said first emitter and base electrodes, said second secondary winding being connected between said second emitter and base electrode, said primary winding being connected between a comparison signal source and a common terminal for applying the comparison signal to each of said transistors simultaneously in a polarity to cause each of said transistors to be conditioned to conduct; a first unidirectional current flow device connected between said first collector electrode and said second base electrode; a second unidirectional current flow device connected between said first base electrode and said second collector electrode; second coupling means connected between said second base electrode and a common terminal point for applying a continuous periodically recurring reference signal to each of said transistors simultaneously to cause either said first or said second transistor to pass the comparison signal during the time the reference signal is applied concurrently therewith; and charge storage means connected between said first base electrode and said common terminal for converting said comparison signal to a direct-current voltage level, whereby a direct-current voltage level will be produced at said storage means representative of the phase relationship between the comparison and reference signals.

3. A transistor phase detector for producing direct-current voltage levels in response to the phase relationships between applied reference and comparison signals comprising: a first junction transistor, including a first emitter electrode, a first collector electrode, and a first base electrode; a second junction transistor, including a second emitter electrode, a second collector electrode, and a second base electrode; first coupling means connected between said first emitter and base electrodes and said second emitter and base electrodes for applying a comparison signal to each of said transistors simultaneously in a polarity to cause each of said transistors to be conditioned to conduct; first rectifying means connected between said first collector electrode and said second base electrode; second rectifying means connected between said second collector electrode and said first base electrode; second coupling means including a capacitor connected between said second base electrode and a comparison signal source, an impedance element connected between said second base electrode and a common terminal point for applying a comparison signal to each of said transistors simultaneously to cause either said first or said second transistor to pass the comparison signal during the time the reference signal is applied concurrently therewith; and charge storage means connected between said first base electrode and said common terminal for converting said comparison signal to a direct-current voltage level, whereby said first transistor will pass the comparison signal if the phase relationship between the comparison signal and the reference signal is of one sense and said second transistor will pass the comparison signal if said phase relationship is of the opposite sense, and whereby said charge storage means will convert the passed comparison signal to a direct-current voltage level representative of said phase relationship.

4. The transistor phase detector of claim 3 wherein said first and said second junction transistors are each of the N–P–N type and said first and second rectifying means are poled to pass current flowing toward said first and second collector electrodes.

5. A transistor phase detector for producing direct-current voltage levels representative of the phase relationships between applied reference and comparison signals comprising: a first junction transistor of the N–P–N type, including a first emitter electrode, a first collector electrode, and a first base electrode; a second junction transistor of the N–P–N type, including a second emitter electrode, a second collector electrode, and a second base electrode; first coupling means including a transformer having a primary winding, a first secondary winding, and a second secondary winding, said first secondary winding being connected between said first emitter and base electrodes, said second secondary winding being connected between said second emitter and base electrode, said primary winding being connected between a comparison signal source and a common terminal for applying a negative going comparison signal across the emitter and base electrodes of each of said transisttors simultaneously to cause each of said transistors to be conditioned to conduct; a first diode connected between said first collector electrode and said second base electrode; a second diode connected between said second collector eletrode and said first base electrode, each of said diodes being poled to pass current flowing toward said collector electrodes; second coupling means including a capacitor connected between said second base electrode and a reference signal source, an impedance element connected between said second base electrode and said common terminal point for applying a reference signal to each of said transistors simultaneously in a polarity to cause either said first or said second transistor to pass the comparison signal during the time the reference signal is applied concurrently therewtih; and a capacitor connected between said first base electrode and said common terminal for converting said comparison signal to a direct-current voltage level, whereby said first transistor will pass the comparison signal if the phase relationship between the comparison signal and the reference signal is of one sense and said second transistor will pass the comparison signal if said phase relationship is of the opposite sense, and whereby said capacitor will convert the passed comparison signal to a direct-current voltage level representative of said phase relationship.

6. A transistor phase detector for producing direct current voltage levels in response to the phase relationships between applied reference and comparison signals comprising: a first transistor including a first input electrode, a first output electrode and a first common electrode, a second transistor including a second input electrode, a second output electrode and a second common electrode, first coupling means connected between said first input and common electrodes and said second input and common electrodes for applying the comparison signal to each of said transistors simultaneously in a polarity to cause each of said transistors to be conditioned to conduct, first asymmetrically conductive means connected between said first output electrode and said second common electrode, second asymmertically conductive means connected between said second output electrode and said first common electrode, means connected between said second common electrode and a common terminal point for applying the reference signal to said transistors simultaneously to cause either said first or said second transistor to translate the comparison signal during the time the reference signal is applied concurrently therewith, and charge storage means connected between said first common electrode and said common terminal point for converting said comparison signal to a direct current voltage level, whereby a direct current voltage level will be produced at said charge storage means representative of the phase relationship between the comparison and reference signals.

References Cited in the file of this patent

UNITED STATES PATENTS

| | | |
|---|---|---|
| 2,579,286 | Adamson | Dec. 18, 1951 |
| 2,605,306 | Eberhard | July 29, 1952 |
| 2,622,212 | Anderson | Dec. 16, 1952 |
| 2,651,673 | Fredendall | Sept. 8, 1953 |
| 2,698,392 | Herman | Dec. 28, 1954 |